US011705109B2

(12) United States Patent
Lesso et al.

(10) Patent No.: US 11,705,109 B2
(45) Date of Patent: Jul. 18, 2023

(54) DETECTION OF LIVE SPEECH

(71) Applicant: Cirrus Logic International Semiconductor Ltd., Edinburgh (GB)

(72) Inventors: John Paul Lesso, Edinburgh (GB); Toru Ido, Tokyo (JP)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/091,316

(22) Filed: Nov. 6, 2020

(65) Prior Publication Data

US 2021/0158797 A1 May 27, 2021

Related U.S. Application Data

(60) Provisional application No. 62/938,377, filed on Nov. 21, 2019.

(51) Int. Cl.
*G10L 15/06* (2013.01)
*G10L 19/26* (2013.01)
(Continued)

(52) U.S. Cl.
CPC .............. *G10L 15/06* (2013.01); *G10L 19/26* (2013.01); *G10L 25/78* (2013.01); *G10L 2025/937* (2013.01)

(58) Field of Classification Search
CPC ......... G10L 15/06; G10L 25/78; G10L 19/26; G10L 2025/937
See application file for complete search history.

(56) References Cited

U.S. PATENT DOCUMENTS 6,480,825 B1 * 11/2002 Sharma .................. G01L 17/00
704/270
2013/0201316 A1 * 8/2013 Binder .................... H04L 29/08
348/77
(Continued)

FOREIGN PATENT DOCUMENTS

WO 2019002417 A1 1/2019
WO 2019097216 A1 5/2019

OTHER PUBLICATIONS

International Search Report and Written Opinion of the International Searching Authority, International Application No. PCT/GB2020/052814, dated Jan. 29, 2021.
(Continued)

*Primary Examiner* — Richemond Dorvil
*Assistant Examiner* — Ethan Daniel Kim
(74) *Attorney, Agent, or Firm* — Jackson Walker L.L.P.

(57) ABSTRACT

A method of detecting live speech comprises: receiving a signal containing speech; obtaining a first component of the received signal in a first frequency band, wherein the first frequency band includes audio frequencies; and obtaining a second component of the received signal in a second frequency band higher than the first frequency band. Then, modulation of the first component of the received signal is detected; modulation of the second component of the received signal is detected; and the modulation of the first component of the received signal and the modulation of the second component of the received signal are compared. It may then be determined that the speech may not be live speech, if the modulation of the first component of the received signal differs from the modulation of the second component of the received signal.

21 Claims, 10 Drawing Sheets

(51) Int. Cl.
*G10L 25/78* (2013.01)
*G10L 25/93* (2013.01)

(56) References Cited

U.S. PATENT DOCUMENTS

2018/0301140 A1* 10/2018 Turcott .................. G10L 13/04
2019/0154439 A1* 5/2019 Binder .................. G01B 11/26

OTHER PUBLICATIONS

Wu, Zhizheng et al: "Synthetic speech detection using temporal modulation feature", ICASSP, IEEE International Conference on Acoustics, Speech and Signal Processingproceedings 1999 IEEE, IEEE, May 26, 2813 (2813-85-26), pp. 7234-7238.

Avila, Anderson R. et al: "Investigating the use of modulation spectral features within an i-vector framework for far-field automatic speaker verification", 2814 International Telecommunications Symposium (ITS), IEEE, Aug. 17, 2814 (Aug. 17, 2814), pp. 1-5.

* cited by examiner

DETECTION OF LIVE SPEECH

The present disclosure claims priority to U.S. Provisional Patent Application Ser. No. 62/938,377, filed Nov. 21, 2019, which is incorporated by reference herein in its entirety.

TECHNICAL FIELD

Embodiments described herein relate to methods and devices for detecting live speech. As one example, the detection of live speech can be used for detecting a replay attack on a voice biometrics system. As another example, the detection of live speech can be used for detecting that speech detected by a smart speaker device is not the speech of a live speaker.

BACKGROUND

Speech detection systems are becoming widely used.

In a voice biometrics system, a user trains the system by providing samples of their speech during an enrollment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

In a smart speaker, or other voice command device, a user is able to interact with a virtual assistant or other computer device by means of a voice user interface. The user's speech is detected, and the words spoken by the user are interpreted, and used to control the operation of the system.

One problem with such systems is that the voice command device may detect extraneous speech, such as speech coming from a television in the same room as the smart speaker, and may attempt to interpret that speech as commands that it should act on.

SUMMARY

According to an aspect of the present invention, there is provided a method of detecting live speech. The method comprises receiving a signal containing speech. Then a first component of the received signal in a first frequency band is obtained, wherein the first frequency band includes audio frequencies, and a second component of the received signal in a second frequency band higher than said first frequency band is obtained. Modulation of the first component of the received signal and modulation of the second component of the received signal are detected. The modulation of the first component of the received signal and the modulation of the second component of the received signal are compared. Then, the method comprises determining whether the speech is live speech, depending on a result of comparing the modulation of the first component of the received signal and the modulation of the second component of the received signal.

Obtaining the first component of the received signal may comprise low-pass filtering the received signal.

Obtaining the second component of the received signal may comprise high-pass filtering the received signal.

The second frequency band may include ultrasound frequencies.

Detecting modulation of the first component of the received signal may comprise:
detecting a first envelope of the first component of the received signal; and
detecting components of the first envelope.

Detecting modulation of the second component of the received signal may comprise:
detecting a second envelope of the second component of the received signal; and
detecting components of the second envelope.

The method may comprise detecting modulation of the first component of the received signal and the second component of the received signal in a frequency band corresponding to a speech articulation rate. The speech articulation frequency band may comprise frequencies below 18 Hz. More specifically, the speech articulation frequency band may comprise frequencies in the range of 5-15 Hz.

Comparing the modulation of the first component of the received signal and the modulation of the second component of the received signal may comprise obtaining a first parameter relating to an amount of modulation of the first component of the received signal; and obtaining a second parameter relating to an amount of modulation of the second component of the received signal. The step of determining that the speech may not be live speech if the modulation of the first component of the received signal differs from the modulation of the second component of the received signal may then comprise determining that the speech may not be live speech if the first parameter exceeds a first threshold, and the second parameter does not exceed a second threshold.

Comparing the modulation of the first component of the received signal and the modulation of the second component of the received signal may comprise obtaining a coefficient acting as a measure of similarity between the modulation of the first component of the received signal and the modulation of the second component of the received signal.

Comparing the modulation of the first component of the received signal and the modulation of the second component of the received signal may comprise using a neural network to compare a series of samples of the modulation of the first component of the received signal and a series of samples of the modulation of the second component of the received signal.

The method may further comprise:
obtaining a third component of the received signal in a third frequency band higher than said first frequency band;
detecting modulation of the third component of the received signal;
comparing the modulation of the second component of the received signal and the modulation of the third component of the received signal; and
determining a source of the speech based on a result of the comparison of the modulation of the second component of the received signal and the modulation of the third component of the received signal.

According to another aspect of the present invention, there is provided a system configured for performing the method of the first aspect.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

According to a further aspect, there is provided a device comprising the non-transitory computer readable storage medium. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

One example of the invention is illustrated with reference to its use in a smartphone, by way of example, though it will be appreciated that it may be implemented in any suitable device, as described in more detail below.

Figure 1:
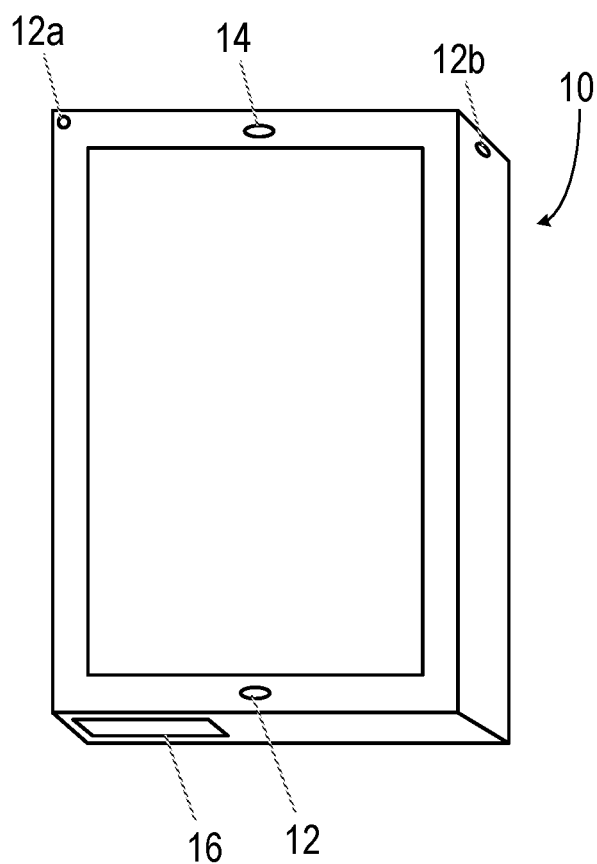
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10.

The smartphone 10 also has two loudspeakers 14, 16. The first loudspeaker 14 is located at the top of the smartphone 10, when it is held in its normal operating position for making a voice call, and is used for playing the sounds that are received from the remote party to the call.

The second loudspeaker 16 is located at the bottom of the smartphone 10, and is used for playing back media content from local or remote sources. Thus, the second loudspeaker 16 is used for playing back music that is stored on the smartphone 10 or sounds associated with videos that are being accessed over the internet.

The illustrated smartphone 10 also has two additional microphones 12a, 12b. The additional microphones, if present in the device, may be provided at any suitable location. In this illustrated device, one microphone 12a is located at the top end of the front of the device, while another microphone 12b is located at the top end of the side of the device.

Figure 2:
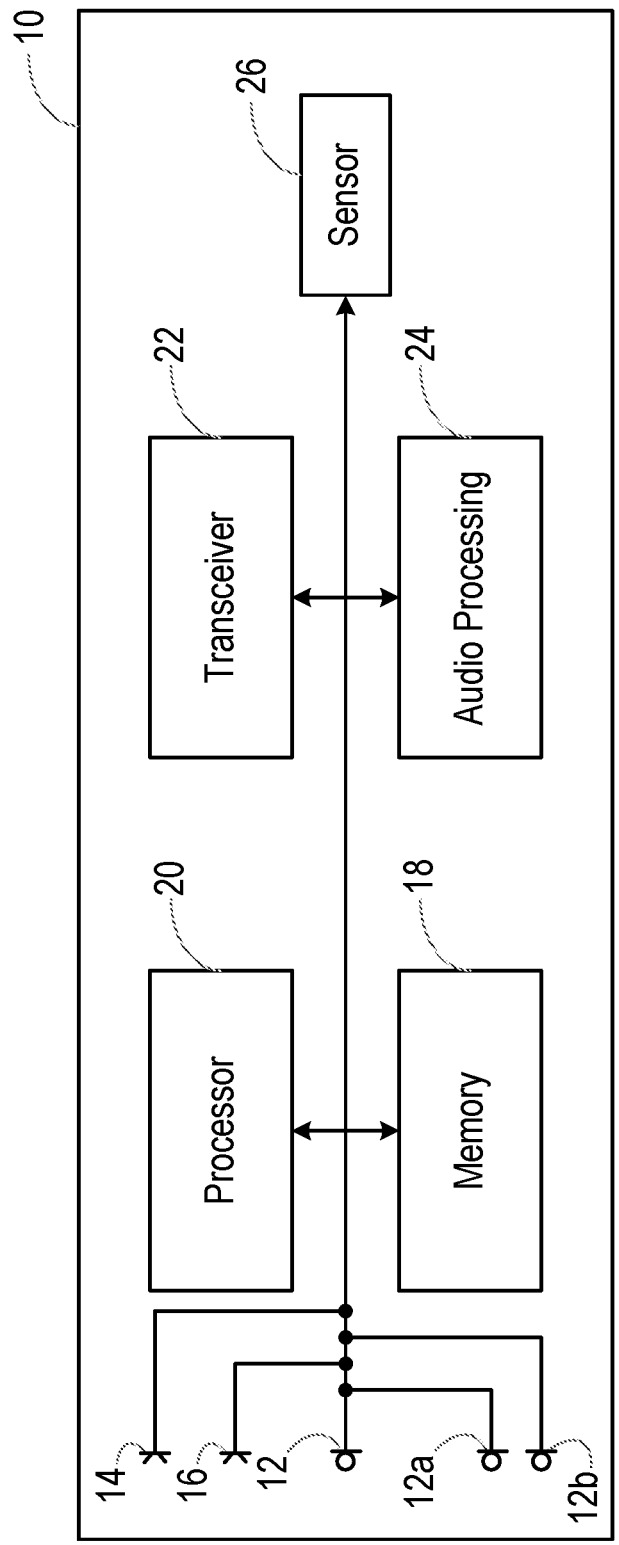
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In this particular illustrated embodiment, the smartphone 10 is provided with multiple microphones 12, 12a, 12b, etc.

FIG. 2 also shows the loudspeakers 14, 16.

FIG. 2 also shows a memory 18, which may in practice be provided as a single component or as multiple components. The memory 18 is provided for storing data and program instructions.

FIG. 2 also shows a processor 20, which again may in practice be provided as a single component or as multiple components. For example, one component of the processor 20 may be an applications processor of the smartphone 10.

FIG. 2 also shows a transceiver 22, which is provided for allowing the smartphone 10 to communicate with external networks. For example, the transceiver 22 may include circuitry for establishing an internet connection over a WiFi local area network and/or over a cellular network.

FIG. 2 also shows audio processing circuitry 24, for performing operations on the audio signals detected by the microphone 12 as required. For example, the audio processing circuitry 24 may filter the audio signals or perform other signal processing operations.

The audio signal processing circuitry is also able to generate audio signals for playback through the loudspeakers 14, 16, as discussed in more detail below.

FIG. 2 also shows that the smartphone 10 may include one or more sensors 26. In certain embodiments, the sensor(s) may include any combination of the following: gyroscopes, accelerometers, proximity sensors, light level sensors, touch sensors, and a camera.

In this illustrated embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 22 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device. In other embodiments, the speech recognition system is also located on the device 10.

One attempt to deceive a voice biometric system is to play a recording of an enrolled user's voice in a so-called replay or spoof attack.

Figure 3:
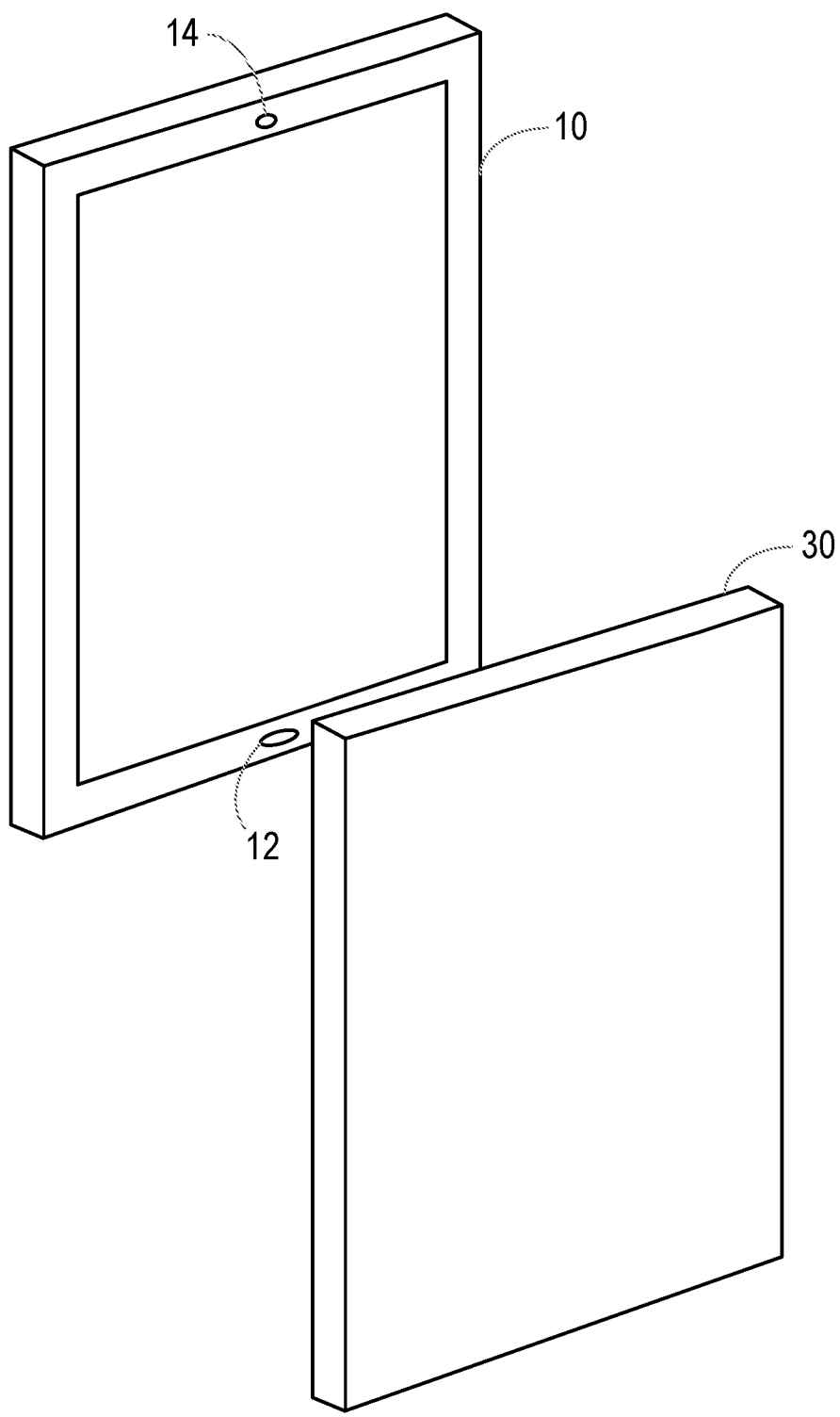
FIG. 3 illustrates a situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to determine that the enrolled user's voice that it recognises is a recording, the attacker will gain access to one or more services that are intended to be accessible only by the enrolled user.

At the same time, or separately, when the smartphone 10 is provided with a camera-based biometric functionality, such as a facial recognition system, an attacker may use the display of the smartphone 30 to show a photo or video of the enrolled user, in an attempt to defeat the facial recognition system.

Embodiments described herein therefore attempt to detect live speech, for example confirming that any voice sounds that are detected are live speech, rather than being played back.

Figure 4:
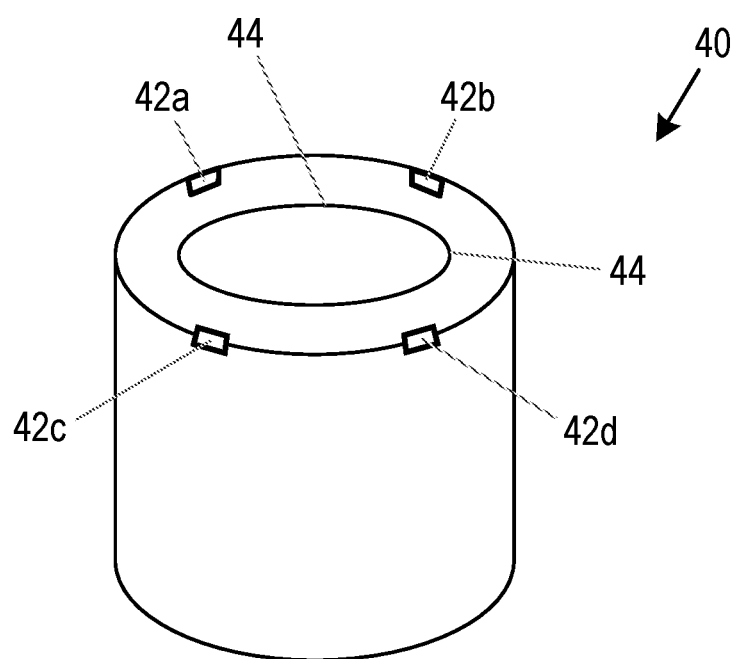
FIG. 4 illustrates a smart speaker device.

FIG. 4 illustrates a smart speaker device 40, having a plurality of microphones 42a, 42b, 42c, 42d for detecting ambient sounds. The intention of the microphones 42a, 42b, 42c, 42d is to detect the speech of a user who is in the vicinity of the device 40.

The smart speaker device 40 also has a loudspeaker 44, for example for playing music in response to a voice command from the user.

Figure 5:
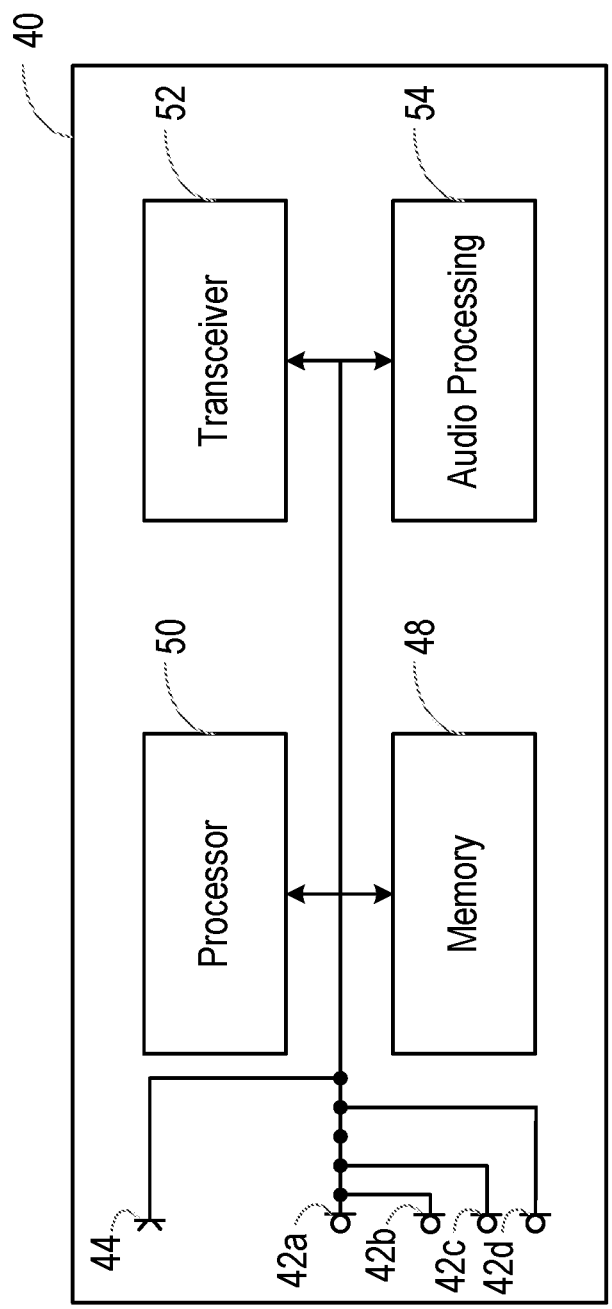
FIG. 5 is a schematic diagram, illustrating the form of the smart speaker device.

FIG. 5 is a schematic diagram, illustrating the form of the smart speaker device 40.

Specifically, FIG. 5 shows various interconnected components of the smart speaker 40. It will be appreciated that the smart speaker 40 will in practice contain many other components, but the following description is sufficient for an understanding of the present invention.

Thus, FIG. 5 shows the microphones 42a, 42b, 42c, 42d. FIG. 5 also shows the loudspeaker 44.

FIG. 5 also shows a memory 48, which may in practice be provided as a single component or as multiple components. The memory 48 is provided for storing data and program instructions.

FIG. 5 also shows a processor 50, which again may in practice be provided as a single component or as multiple components.

FIG. 5 also shows a transceiver 52, which is provided for allowing the smart speaker device 40 to communicate with external networks. For example, the transceiver 52 may include circuitry for establishing an internet connection over a WiFi local area network and/or over a cellular network.

FIG. 5 also shows audio processing circuitry 54, for performing operations on the audio signals detected by the microphones 42a, 42b, 42c, 42d as required. For example, the audio processing circuitry 54 may filter the audio signals or perform other signal processing operations.

The audio signal processing circuitry 54 is also able to generate audio signals for playback through the loudspeaker 44, for example in response to user commands.

In this illustrated embodiment, the smart speaker device 40 is provided with voice biometric functionality, and with control functionality. Thus, the smart speaker device 40 is able to perform various functions in response to detected spoken commands from a user. The smart speaker device 40 may be provided with biometric functionality, allowing it to distinguish between spoken commands from an enrolled user, and the same commands when spoken by a different person.

Certain detected commands (for example controlling heating or lighting in a room) may be performed, regardless of whether the person speaking is determined to be an enrolled user. Other commands (for example, paying for goods or services) may be performed only if the person speaking is determined to be an enrolled user. Still further commands (for example, "play my favourite music") may be performed in a different manner, depending on the identity of the detected speaker. Thus, the commands may relate to operation of the smart speaker device itself, while other commands may be transmitted to a separate device that is to be controlled.

In some embodiments, the spoken commands are transmitted using the transceiver 52 to a remote speech recognition system, which determines the meaning of the spoken commands. For example, the speech recognition system may be located on one or more remote server in a cloud computing environment. Signals based on the meaning of the spoken commands are then returned to the smart speaker 40 or other local device. In other embodiments, the speech recognition system is also located on the device 40.

One difficulty that may arise is when the smart speaker device 40 detects speech that has not been spoken by a person, but, for example, has been played through the speakers of a TV set in the vicinity of the smart speaker.

Figure 6:
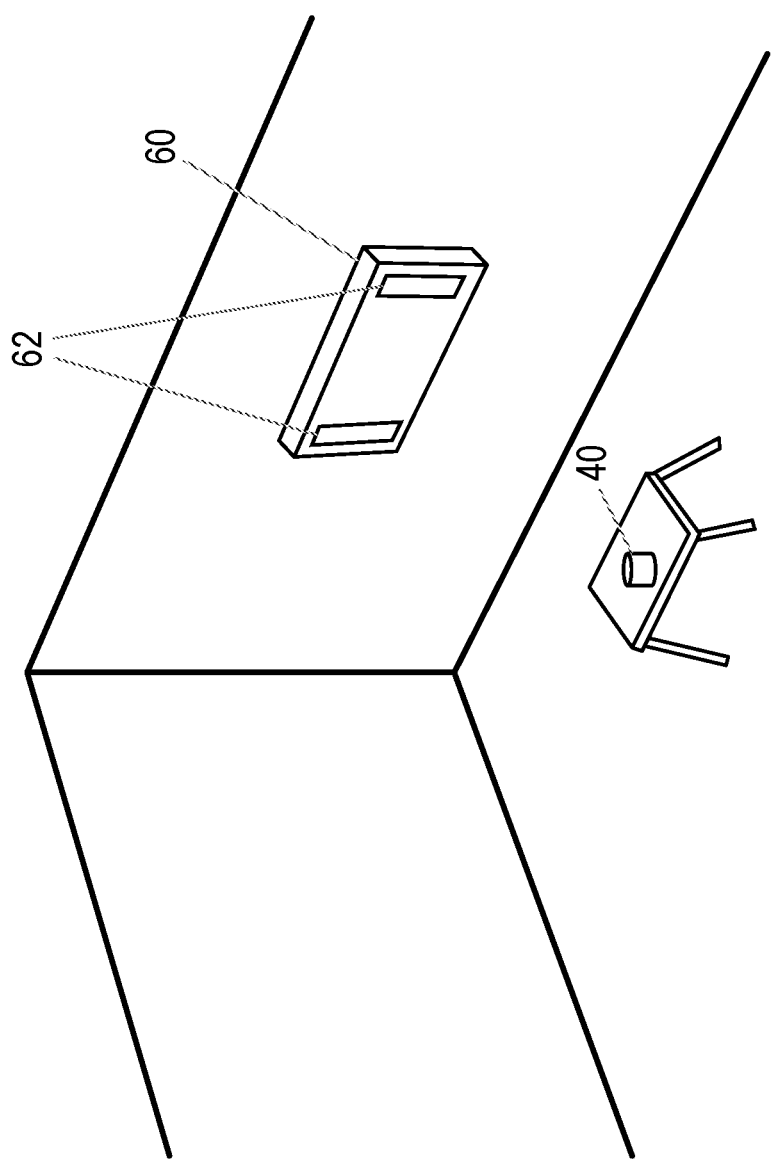
FIG. 6 illustrates a situation in which a smart speaker device detects extraneous speech.

FIG. 6 illustrates this situation. Thus, in FIG. 6, the smart speaker device 40 is located in a room, where a television set 60 is mounted on a wall of the room.

When sounds are played through the speakers 62 of the television set 60, those sounds will be detected by the microphones of the smart speaker device 40. When those sounds include spoken words, it is probable that the smart speaker device will attempt to interpret those words, as if they were spoken by a live person in the room.

Embodiments described herein therefore attempt to detect live speech, for example confirming that any voice sounds that are detected are live speech, rather than being played back.

Figure 7:
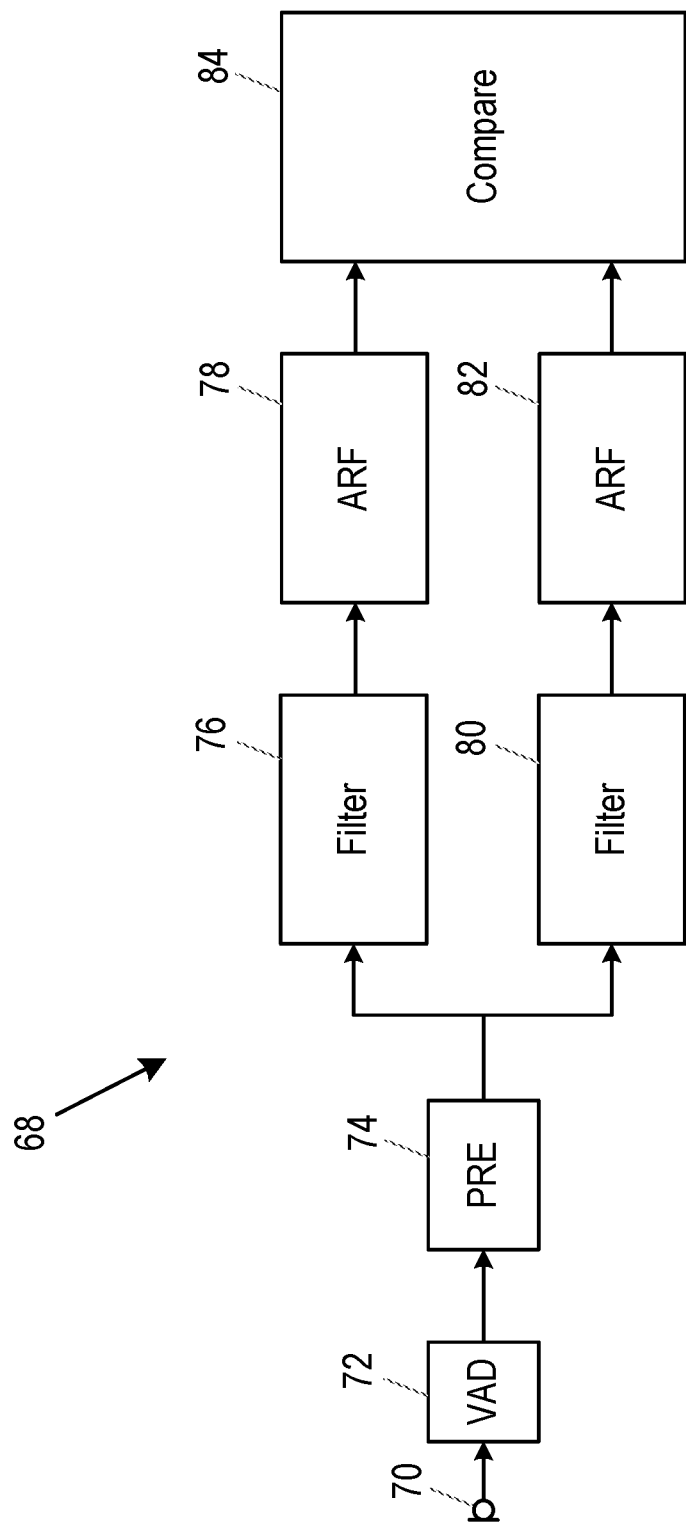
FIG. 7 illustrates a speech processing system, for use in the smartphone of FIG. 1, or the smart speaker device of FIG. 4.

FIG. 7 is a schematic block diagram, illustrating a system 68 for detecting live speech.

It is known that a signal representing speech will contain components at a speech articulation rate, typically in the frequency range of 2-15 Hz, for example 4-5 Hz, for example 2 to 10 Hz, for example, 4-10 Hz.

It is also known that many sound recording and playback systems are not good at reproducing signals across a wide frequency range. For example, devices such as smartphones and televisions typically include sound reproduction systems that are not good at reproducing signals at frequencies above the normal range of human hearing, that is, above the audio band, or more precisely at frequencies above about 15 kHz, or above about 20 kHz.

One issue is that a signal that is recorded by a smartphone will typically have a relatively low sample rate, for example 16 kHz, and will therefore only be able to record components of the sound within a relatively narrow bandwidth. Such a signal, even when played through a high quality loudspeaker that is potentially able to reproduce frequencies up to 100 kHz, will not reproduce components of the original sound above 8 kHz (because 16 kHz is the Nyquist sampling rate for signals at 8 kHz).

A second issue is that a smartphone loudspeaker is not designed to reproduce high frequency signals. For example, such a loudspeaker might be unable to reproduce signals above 20 kHz, and might be unable to faithfully reproduce signals above about 15 kHz.

However, it is noted now that human speech does contain significant power at frequencies above the audio band, and therefore it should be expected that a high frequency component of a signal representing live speech should be modulated at a speech articulation rate. By contrast, a replayed signal may no longer contain all of the frequencies above the audio band, and therefore it is now recognised that a replayed signal may not be modulated at the speech articulation rate in the same way as a signal representing live speech.

The system 68 is intended to detect this discrepancy.

FIG. 7 shows a microphone 70, which may for example be one of the microphones 12, 12a, 12b in the smartphone 10 shown in FIGS. 1 and 2, or may be one of the microphones 42a, 42b, 42c, 42d in the smart speaker 40 shown in FIGS. 4 and 5.

In this embodiment, the microphone 70 is connected to a voice activity detection (VAD) block 72, which may for example perform various pre-processing steps such as analog-digital conversion of the received signal, with a sample rate of, say, 96 kHz in order to ensure that the digital signal contains components of the analog signal at frequencies well into the ultrasound band. The VAD block 72 may also divide the received signal into frames, and then detect the presence of speech in the received signal. When no speech is present, then the signal is not passed to the rest of the system 68.

Thus, in this embodiment, the VAD 72 detects whether the received signal has properties that are characteristic of speech, and the rest of the system 68 determines whether the detected speech is live speech. In other embodiments, the system 68 can operate in an "always on" manner, in which there is no VAD block 72, and the signal from the microphone 70 is always processed, so that the system can determine whether the signal represents live speech. In such embodiments, the system 68 can itself act as a voice activity detector that only detects live speech, and thus the output of the system 68 can be used to control whether downstream functions such as speaker recognition and speech recognition should be activated.

It is known that speech can be divided into voiced sounds and unvoiced or voiceless sounds. Speech is composed of phonemes, which are produced by the vocal cords and the vocal tract (which includes the mouth and the lips). Voiced speech signals are produced when the vocal cords vibrate during the pronunciation of a phoneme. Unvoiced speech signals, by contrast, do not entail the use of the vocal cords. Voiced speech signals, such as the vowels /a/, /e/, /i/, /u/, /o/, tend to be louder and/or comprise more power at lower frequencies. Unvoiced speech signals, such as the consonants /p/, /t/, /k/, /s/, /z/, /f/, and /v/, tend to be more abrupt and/or comprise more power at high frequencies.

In view of this, it is expected that if the received signal arriving at the VAD 72 comprises unvoiced speech, then there would be more modulation of the received signal at higher frequencies when compared to voiced speech. In contrast, if the received signal arriving at the VAD 72 comprises voiced speech, then there would be less modulation of the received signal at high frequencies when compared to unvoiced speech, but a similar amount of modulation at lower frequencies to that of unvoiced speech.

In view of the above and since voiced and unvoiced speech have different frequency properties, in some embodiments, the VAD 72 may detect different parts of a user's speech, such as voiced and unvoiced speech in the received signal and make a determination regarding whether the speech is live based only on segments of a particular acoustic class (i.e. voiced speech or unvoiced speech). For example, the VAD 72 may detect whether the received signal has properties that are characteristic of unvoiced speech, and the rest of the system 68 determines whether the detected unvoiced speech is live speech. For example, the VAD 72 may detect whether the received signal has properties that are characteristic of voiced speech, and the rest of the system 68 determines whether the detected voiced speech is live speech.

When there is no VAD block 72, an input processing block may still perform the pre-processing functions mentioned above, such as analog-digital conversion of the received signal, and dividing the received signal into frames.

The received signal is then passed to an optional pre-emphasis filter (PRE) 74, which acts to boost the higher frequencies in the received signal, since in general they are of much lower amplitude than the audio band signals.

The received signal, after any pre-filtering, is then split into multiple bands. In this illustrated embodiment, the signal is split into two bands. In other embodiments, the signal is split into three or more bands.

Specifically, the received signal is passed to a first filter 76, which in one embodiment is a low pass filter, for example a $2^{nd}$ order low pass filter, with a cut-off frequency of 5 kHz.

The signal component in this first frequency band is passed to a first articulation rate filter (ARF) 78, which is used to detect modulation of the first signal component at frequencies corresponding to a speech articulation rate, as discussed in more detail below.

Similarly, the received signal is passed to a second filter 80, which in one embodiment is a high pass filter, with a cut-off frequency of 10 kHz.

The signal component in this second frequency band is passed to a second articulation rate filter (ARF) 82, which is used to detect modulation of the second signal component at frequencies corresponding to a speech articulation rate.

Figure 8:
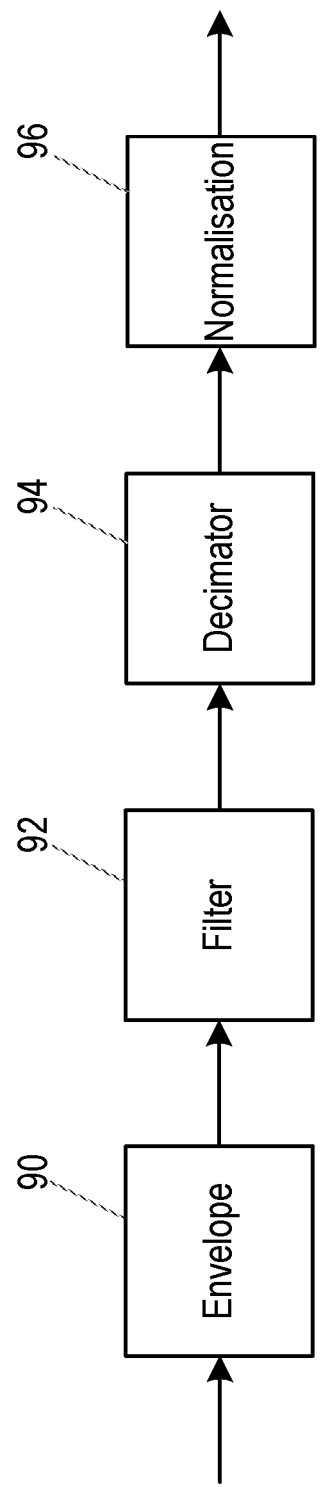
FIG. 8 illustrates in more detail a part of the speech processing system of FIG. 7.

FIG. 8 shows the general form of the articulation rate filters 78, 82.

Specifically, each articulation rate filter comprises an envelope tracker or detector 90, for detecting modulation of the respective signal component.

For example, the envelope detector 90 may implement a Hilbert transform filter, the envelope detector 90 may square its input signal and low pass filter the result, the envelope detector 90 may take the absolute value of its input signal and low pass filter the result, or the envelope detector 90 may include a suitable time-varying filter.

The output of the envelope detector 90 is then passed to a filter 92, for detecting the component of the detected modulation at a speech articulation rate.

The filter 92 may therefore for example be a bandpass filter centred on a frequency in the region of 10 Hz, or may be a low pass filter with a cut-off frequency at about 20 Hz.

The output of the filter 92 might also be passed to a decimator 94 to reduce the data rate from the original sample rate, for example 96 kHz, to a much lower rate such as 50 Hz or 100 Hz, which is still sufficient to capture the modulation at the speech articulation rate.

Thus, the system 68 looks for energy in the modulation spectrum in the region of 5-15 Hz for at least two frequency bands of the input signal.

In some embodiments, one of these frequency bands is inside the audio band (i.e. <20 kHz), and one of these frequency bands is outside the audio band (i.e. >20 kHz.).

In some embodiments, the output of the filter 92, in addition to the decimation by the decimator 94, might also be buffered and passed to a normalisation block 96. In one embodiment, where the received signal has been downsampled to a sample rate of 50 Hz, the buffer is able to store the 50 most recent sample values, i.e. the samples representing the most recent 1 second of the signal.

The normalisation might then involve multiplying each of the buffered samples by the same multiplication factor, such that the largest sample value becomes equal to 1.

In some embodiments, the process of normalisation is performed separately on the two signals passing through the articulation rate filters 78, 82 respectively.

In other embodiments, the process of normalisation is performed jointly on the two signals passing through the articulation rate filters 78, 82, with each of the buffered samples being multiplied by the same multiplication factor, so that the largest sample value in either of the two articulation rate filters becomes equal to 1, with the result that the largest sample value in the other of the two articulation rate filters becomes equal to a value that is less than 1.

The process of normalisation that is used might be min/max normalisation, where all the samples in the buffer (which may be the most recent samples if the articulation rate filter 78 or 82, or might be the most recent samples in the two articulation rate filters 78, 82, as explained above) are normalised to be in the range (0,1).

Thus, where the minimum sample value is defined as min(data), and the maximum sample value is defined as max(data), a sample of value data is normalised to a value N, where:

$$N=(data-min(data))/(max(data)-min(data)).$$

Figure 9:
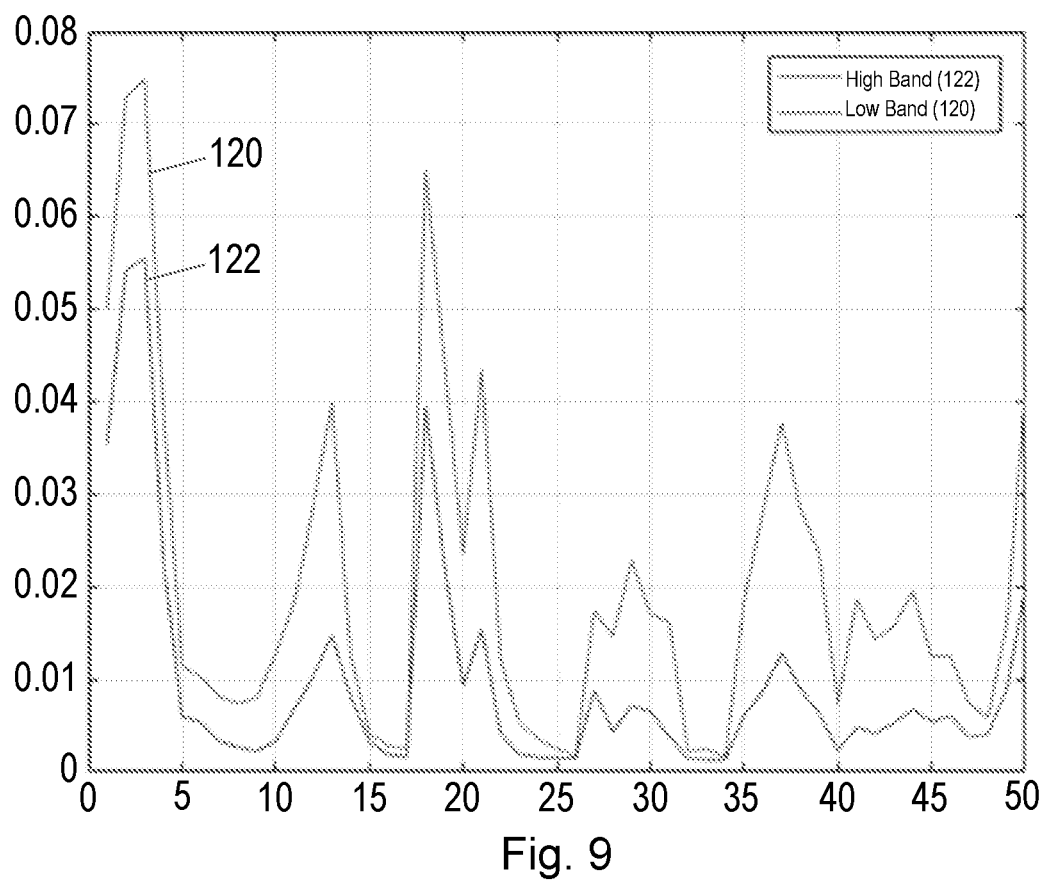
FIGS. 9 and 10 illustrate data generated in the speech processing system of FIG. 7.
Figure 10:
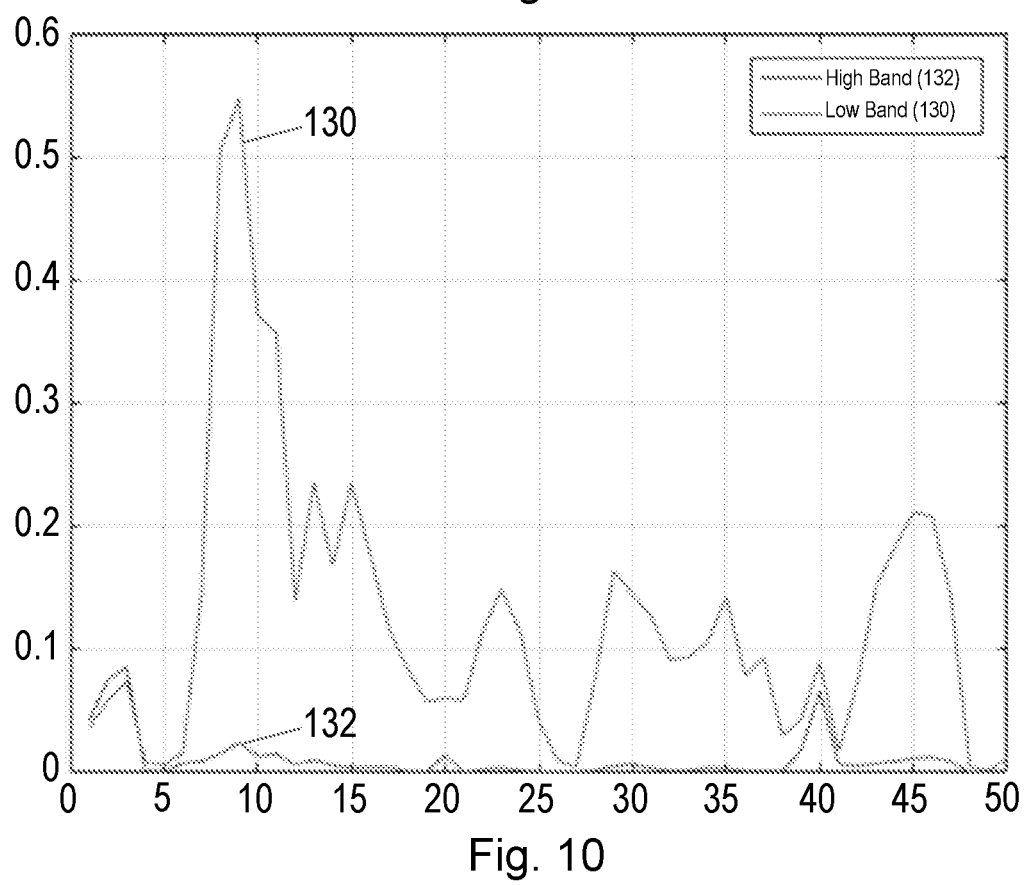

FIGS. 9 and 10 show examples of the data generated by the articulation rate filters 78, 82. Specifically, FIGS. 9 and 10 show the data generated by the respective decimators 94 in the articulation rate filters 78, 82 before the normalisation step. More specifically, FIG. 9 shows an example of the data generated in response to live speech, while FIG. 10 shows an example of the data generated in response to replayed speech.

In FIG. 9, the line 120 indicates the values for the 50 samples that represent 1 second of speech, after downsampling, generated by the first filter 76, in an embodiment where this is a low pass filter, for example with a cut-off frequency of 5 kHz. The line 122 indicates the values for the 50 samples that represent 1 second of speech, after downsampling, generated by the second filter 80, in an embodiment where this is a high pass filter, for example with a cut-off frequency of 10 kHz.

In this case, it can be seen that there is a reasonably high degree of correlation between the lines 120, 122, and this results from the fact that the input to the system is live speech, in which the high frequency components are still intact, and the articulation rate filter 82 is able to detect modulation of the higher frequency components at a speech articulation rate.

In FIG. 10, the line 130 indicates the values for the 50 samples that represent 1 second of speech, after downsampling, generated by the first filter 76, in an embodiment where this is a low pass filter, for example with a cut-off frequency of 5 kHz. The line 132 indicates the values for the 50 samples that represent 1 second of speech, after downsampling, generated by the second filter 80, in an embodiment where this is a high pass filter, for example with a cut-off frequency of 10 kHz.

In this case, it can be seen that there is very little correlation between the lines 130, 132, and this results from the fact that the input to the system is replayed speech, in which the high frequency components have been largely removed by the limitations of the recording and playback system, and the articulation rate filter 82 is no longer able to detect modulation of the higher frequency components at a speech articulation rate.

The outputs of the articulation rate filters 78, 82 are passed to a comparison block 84, where they are used to determine whether the received speech is or is not live speech.

For example, if both of the frequency bands show modulation at a speech articulation rate, then it may be assumed that the speech is live. However, if the modulation in the two frequency bands is different, for example if modulation is only detected in the lower frequency (that is, for example, the audio) band component and not in the higher frequency (that is, for example, the ultrasound) band, then it may be assumed that the received speech has been replayed through a sound reproduction device and is not live speech.

The comparison block 84 may for example operate by calculating a value of a parameter indicating a respective degree of articulation rate modulation in each of the two frequency bands. The parameter may for example be a peak signal value, a max-min value, a root-mean-square value, or the like.

Each of the calculated parameter values is then compared with a respective threshold value.

The comparison block 84 may calculate a value for a different parameter for each of the two frequency bands.

Alternatively, the comparison block 84 may calculate a value for the same parameter for each of the two frequency bands. In that case, the calculated parameter values may be compared with a common threshold value, or they may be compared with different respective threshold values. For example, if the chosen parameter is the peak power level of the modulation in the audio and non-audio bands, it would be expected that the power level in the non-audio band would be lower than that in the audio band even when receiving live speech, and so the threshold value chosen for the comparison might be set to be lower for the articulation rate modulation of the non-audio band component than for the articulation rate modulation of the audio band component.

If the received signal represents live speech, then it would be expected that the amount of articulation rate modulation would exceed the respective threshold, and so, if it is found that both calculated values of the parameter exceed the respective threshold, then it may be assumed that the received signal represents live speech. By contrast, if only one of the calculated parameter values exceeds the respective threshold, and in particular if it is the calculated parameter value for the non-audio band that does not exceed the threshold value, then it may be assumed that the received signal does not represent live speech.

Alternatively, the comparison block 84 may calculate a parameter value indicating a degree of similarity between the amounts of articulation rate modulation in the two frequency bands, for example a Pearson correlation coefficient.

As a further alternative, the comparison block 84 may comprise a neural network, which may be used to determine whether the two frequency bands show sufficiently similar modulation at a speech articulation rate that it may be assumed that the speech is live, or whether they show sufficiently different modulation at the speech articulation rate that it may be assumed that the received speech has been replayed through a sound reproduction device and is not live speech.

As described above, the inputs to a neural network may be the output signals of the ARF blocks 78, 82 after they have been down-sampled, for example to a sample rate of 50 Hz, and then buffered. The resulting sets of samples may then be applied to a convolutional neural network for classification.

The neural network can be trained using data that comprises output signals of the ARF blocks resulting from input signals that comprise live speech and output signals of the ARF blocks resulting from input signals that comprise replayed speech, in order to be able to distinguish between them. The training data may also comprise output signals of the ARF blocks resulting from input signals that comprise the high frequency component of the live speech of a first speaker and the low frequency component of the live speech of a second speaker, so that the neural network is able to recognise such inputs as also resulting from an attack on the system.

Thus, the comparison block 84 may generate an output signal based on the data gathered during a predetermined time period, for example 1 second in the embodiments described above. Moreover, as new data is received, this output signal may be regenerated after every received sample, so that the system is able to react quickly to a change in the form of the input. Alternatively, a new output signal may be generated after each predetermined time period, for example after each 1 second in the embodiments described above, so that the output signal is based on the input signal received during the previous second. Alternatively, an interim output signal may be generated after each predetermined time period, for example after each 1 second in the embodiments described above, with a final output signal being generated after an input speech signal has finished, based on the interim output signals generated during the input speech.

Figure 11:
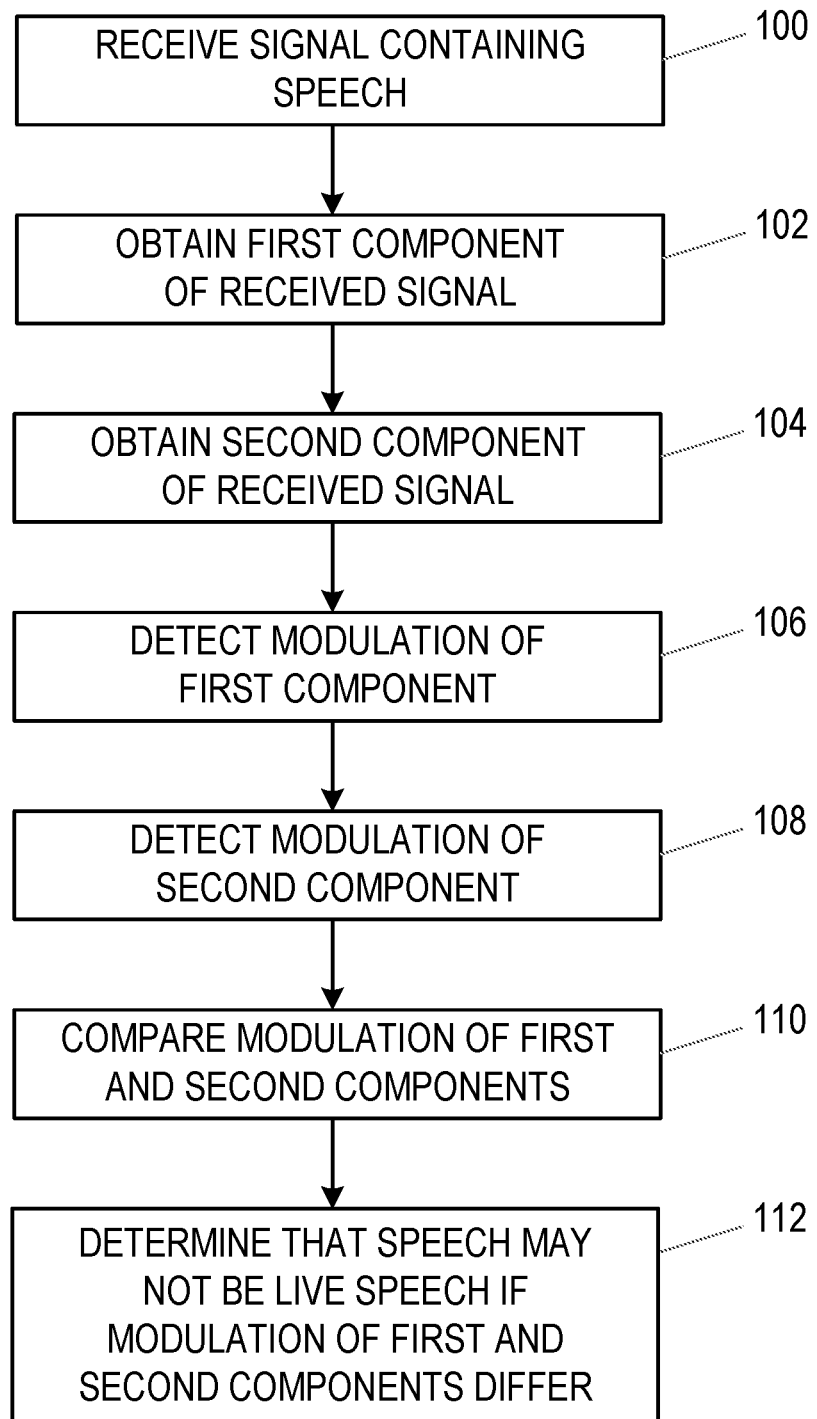
FIG. 11 is a flow chart illustrating a method of operation of a speech processing system.

FIG. 11 is a flow chart, illustrating a method of detecting live speech.

The method begins at step 100, by receiving a signal containing speech.

At step 102, a first component of the received signal is obtained, namely a component in a first frequency band. The first frequency band may include audio frequencies.

The first component of the received signal may be obtained by low-pass filtering the received signal. For example, the first component of the received signal may be obtained by low-pass filtering the received signal with a filter having a cut-off frequency that is within the audio band.

At step 104, a second component of the received signal is obtained, namely a component in a second frequency band. The second frequency band may be higher than the first frequency band.

The second component of the received signal may be obtained by high-pass filtering the received signal. In that case, the second frequency band may include ultrasound frequencies, i.e. frequencies above the normal range of human hearing. However, the second frequency band may also include audio frequencies. Thus, when the second component of the received signal is obtained by high-pass filtering the received signal, the filter cut-off frequency may be in the region of 10-20 kHz.

The second component of the received signal may be chosen so that it contains frequencies at which live speech can be distinguished from replayed speech. For example, when it is desired to detect speech that has been recorded by a conventional smartphone, or replayed through a standard television speaker, it may be sufficient for the second component to include frequencies in the region of 10-20 kHz, and so a bandpass filter or high-pass filter that passes frequencies in this range may be suitable. When it is desired to detect speech that has been recorded using high-fidelity recording equipment, the recording may have a sample rate of more than 16 kHz. When such a recording is replayed through a high-end speaker, that speaker may reproduce signals at up to a limiting frequency in the region of 100 kHz with high fidelity, and so it may be necessary for the second component to include frequencies in the region of 20-40 kHz in order to distinguish the replayed speech from live speech.

At step 106, modulation of the first component of the received signal is detected.

Detecting modulation of the first component of the received signal may comprise detecting a first envelope of the first component of the received signal, and then detecting components of the first envelope.

At step 108, modulation of the second component of the received signal is detected.

Similarly, detecting modulation of the second component of the received signal may comprise detecting a second envelope of the second component of the received signal, and then detecting components of the second envelope.

More specifically, in steps 106 and 108 modulation of the first component of the received signal may be detected in a frequency band corresponding to a speech articulation rate, and similarly modulation of the second component of the received signal in a frequency band may be detected in a frequency band corresponding to a speech articulation rate.

The frequency band corresponding to the speech articulation may comprise frequencies below 18 Hz. More specifically, the speech articulation frequency band may comprise frequencies in the range of 5-15 Hz, although it may also include frequencies outside this range. In other examples, the speech articulation frequency band may be 3-9 Hz, 3-11 Hz, 3-14 Hz, 3-18 Hz, 4-9 Hz, 4-11 Hz, 4-14 Hz, 4-18 Hz, 5-7 Hz, 5-9 Hz, 5-11 Hz, or 5-14 Hz.

In some embodiments, the input signal may be detected by a microphone, and then converted into a digital signal with a sample rate of, say, 96 kHz, to ensure that all signal components of interest are retained. The processing described above, that is, the filtering of the received signal to generate first and second components, and the detection of the modulation of these components, for example in the speech articulation frequency band, may be performed in the digital domain, at this high sample rate.

In this case, as described above, the output signals of the articulation rate filters may be downconverted, for example to a sample rate of 50 Hz or 100 Hz.

In other embodiments, the filtering of the received signal to generate the first and second components, and the detection of the modulation of these components, may be performed in the analog domain.

At step 110, the modulation of the first component of the received signal and the modulation of the second component of the received signal are compared.

At step 112, it is determined that the speech may not be live speech if the modulation of the first component of the received signal differs from the modulation of the second component of the received signal by more than a certain amount.

In step 110, comparing the modulation of the first component of the received signal and the modulation of the second component of the received signal may comprise obtaining a first parameter relating to an amount of modulation of the first component of the received signal, for example at the speech articulation rate, and also obtaining a second parameter relating to an amount of modulation of the second component of the received signal, similarly at the speech articulation rate.

In that case, in step 112, it may be determined that the speech may not be live speech if the first parameter exceeds a first threshold, and the second parameter does not exceed a second threshold.

In step 110, comparing the modulation of the first component of the received signal and the modulation of the second component of the received signal may comprise obtaining a coefficient acting as a measure of similarity between the modulation of the first component of the received signal, for example at the speech articulation rate, and the modulation of the second component of the received signal, for example at the speech articulation rate.

In step 110, comparing the modulation of the first component of the received signal and the modulation of the second component of the received signal may comprise using a neural network to test for similarity between a series of samples of the modulation of the first component of the received signal, for example at the speech articulation rate, and a series of samples of the modulation of the second component of the received signal, for example at the speech articulation rate.

The method described above may further comprise obtaining a third component of the received signal in a third frequency band higher than said first frequency band, and detecting modulation of the third component of the received signal.

The method may then comprise comparing the modulation of the second component of the received signal and the modulation of the third component of the received signal. A source of the speech may then be determined based on a result of the comparison of the modulation of the second component of the received signal and the modulation of the third component of the received signal.

Thus, one example may be where the first component of the received signal comprises signals in a first frequency band up to 10 kHz, the second component of the received signal comprises signals in a second frequency band above 20 kHz, and the third component of the received signal comprises signals in a third frequency band from 12-16 kHz.

In that case, if all three components of the received signal contain significant levels of speech articulation rate modulation, it may be assumed that the received signal represents live speech.

If the first component of the received signal contains significant levels of speech articulation rate modulation, but the second and third components of the received signal both contain very low levels of speech articulation rate modulation, this may suggest that the received signal represents speech that has been recorded by and/or replayed through a device that poorly reproduces frequencies above about 12 kHz.

However, if the first and third components of the received signal contain significant levels of speech articulation rate modulation, but the second component of the received signal contains very low levels of speech articulation rate modulation, this may suggest that the received signal represents speech that has been recorded by and/or replayed through a device that poorly reproduces frequencies above about 20 kHz.

Thus, the comparison between the speech articulation rate modulation of the second and third components of the received signal allows a deduction to be made about the properties of the device through which the speech has been recorded and/or replayed.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of detecting live speech, the method comprising:
receiving a signal containing speech;
obtaining a first component of the received signal in a first frequency band, wherein the first frequency band includes audio frequencies;
obtaining a second component of the received signal in a second frequency band higher than said first frequency band;
detecting modulation of the first component of the received signal;
detecting modulation of the second component of the received signal;
comparing the modulation of the first component of the received signal and the modulation of the second component of the received signal, wherein comparing the modulation of the first component of the received signal and the modulation of the second component of the received signal comprises:
obtaining a first parameter relating to an amount of modulation of the first component of the received signal; and
obtaining a second parameter relating to an amount of modulation of the second component of the received signal; and
determining whether the speech is live speech, depending on a result of comparing the modulation of the first component of the received signal and the modulation of the second component of the received signal, wherein determining that the speech may not be live speech if the modulation of the first component of the received signal differs from the modulation of the second component of the received signal comprises determining that the speech may not be live speech if the first parameter exceeds a first threshold, and the second parameter does not exceed a second threshold.

2. A method according to claim 1, wherein obtaining the first component of the received signal comprises low-pass filtering the received signal.

3. A method according to claim 1, wherein obtaining the second component of the received signal comprises high-pass filtering the received signal.

4. A method according to claim 1, wherein the second frequency band includes ultrasound frequencies.

5. A method according to claim 1, wherein detecting modulation of the first component of the received signal comprises:
detecting a first envelope of the first component of the received signal; and
detecting components of the first envelope.

6. A method according to claim 1, wherein detecting modulation of the second component of the received signal comprises:
detecting a second envelope of the second component of the received signal; and
detecting components of the second envelope.

7. A method according to claim 1, comprising detecting modulation of the first component of the received signal and the second component of the received signal in a frequency band corresponding to a speech articulation rate.

8. A method according to claim 7, wherein the speech articulation frequency band comprises frequencies below 18 Hz.

9. A method according to claim 8, wherein the speech articulation frequency band comprises frequencies in the range of 5-15 Hz.

10. A method according to claim 1, wherein comparing the modulation of the first component of the received signal and the modulation of the second component of the received signal comprises:

obtaining a coefficient acting as a measure of similarity between the modulation of the first component of the received signal and the modulation of the second component of the received signal.

11. A method according to claim 1, wherein comparing the modulation of the first component of the received signal and the modulation of the second component of the received signal comprises:
using a neural network to compare a series of samples of the modulation of the first component of the received signal and a series of samples of the modulation of the second component of the received signal.

12. A method according to claim 1, further comprising:
obtaining a third component of the received signal in a third frequency band higher than said first frequency band;
detecting modulation of the third component of the received signal;
comparing the modulation of the second component of the received signal and the modulation of the third component of the received signal; and
determining a source of the speech based on a result of the comparison of the modulation of the second component of the received signal and the modulation of the third component of the received signal.

13. A method according to claim 1, further comprising:
detecting one or more acoustic classes of the speech in the received signal; and
wherein the steps of comparing the modulation of the first component of the received signal and the modulation of the second component of the received signal; and determining whether the speech is live speech are performed based on the detected one or more acoustic classes of the speech.

14. The method of claim 13, wherein the one or more acoustic classes comprise unvoiced speech and/or voiced speech.

15. A system for detecting live speech, wherein the system is configured to perform a method comprising:
receiving a signal containing speech;
obtaining a first component of the received signal in a first frequency band, wherein the first frequency band includes audio frequencies;
obtaining a second component of the received signal in a second frequency band higher than said first frequency band;
detecting modulation of the first component of the received signal;
detecting modulation of the second component of the received signal;
comparing the modulation of the first component of the received signal and the modulation of the second component of the received signal, wherein comparing the modulation of the first component of the received signal and the modulation of the second component of the received signal comprises:
obtaining a first parameter relating to an amount of modulation of the first component of the received signal; and
obtaining a second parameter relating to an amount of modulation of the second component of the received signal; and
determining whether the speech is live speech, depending on a result of comparing the modulation of the first component of the received signal and the modulation of the second component of the received signal, wherein determining that the speech may not be live speech if the modulation of the first component of the received signal differs from the modulation of the second component of the received signal comprises determining that the speech may not be live speech if the first parameter exceeds a first threshold, and the second parameter does not exceed a second threshold.

16. A device comprising a system according to claim 15.

17. A device according to claim 16, wherein the device comprises a mobile telephone, an audio player, a video player, a mobile computing platform, a games device, a remote controller device, a toy, a machine, or a home automation controller or a domestic appliance.

18. A non-transitory computer readable storage medium having computer-executable instructions stored thereon that, when executed by processor circuitry, cause the processor circuitry to perform a method comprising:
receiving a signal containing speech;
obtaining a first component of the received signal in a first frequency band, wherein the first frequency band includes audio frequencies;
obtaining a second component of the received signal in a second frequency band higher than said first frequency band;
detecting modulation of the first component of the received signal;
detecting modulation of the second component of the received signal;
comparing the modulation of the first component of the received signal and the modulation of the second component of the received signal, wherein comparing the modulation of the first component of the received signal and the modulation of the second component of the received signal comprises:
obtaining a first parameter relating to an amount of modulation of the first component of the received signal; and
obtaining a second parameter relating to an amount of modulation of the second component of the received signal; and
determining whether the speech is live speech, depending on a result of comparing the modulation of the first component of the received signal and the modulation of the second component of the received signal, wherein determining that the speech may not be live speech if the modulation of the first component of the received signal differs from the modulation of the second component of the received signal comprises determining that the speech may not be live speech if the first parameter exceeds a first threshold, and the second parameter does not exceed a second threshold.

19. A device comprising a non-transitory computer readable storage medium according to claim 18.

20. A device according to claim 19, wherein the device comprises a mobile telephone, an audio player, a video player, a mobile computing platform, a games device, a remote controller device, a toy, a machine, or a home automation controller or a domestic appliance.

21. A method of detecting live speech, the method comprising:
receiving a signal containing speech;
obtaining a first component of the received signal in a first frequency band, wherein the first frequency band includes audio frequencies;
obtaining a second component of the received signal in a second frequency band higher than said first frequency band;

detecting modulation of the first component of the received signal;
detecting modulation of the second component of the received signal;
comparing the modulation of the first component of the received signal and the modulation of the second component of the received signal;
determining whether the speech is live speech, depending on a result of comparing the modulation of the first component of the received signal and the modulation of the second component of the received signal;
obtaining a third component of the received signal in a third frequency band higher than said first frequency band;
detecting modulation of the third component of the received signal;
comparing the modulation of the second component of the received signal and the modulation of the third component of the received signal; and
determining a source of the speech based on a result of the comparison of the modulation of the second component of the received signal and the modulation of the third component of the received signal.

\* \* \* \* \*